United States Patent [19]

Holley

[11] Patent Number: 5,022,840
[45] Date of Patent: Jun. 11, 1991

[54] AGGLOMERATION DEVICE

[76] Inventor: Carl A. Holley, 14315 Tall Oaks, Riverview, Mich. 48192

[21] Appl. No.: 515,076

[22] Filed: Apr. 26, 1990

[51] Int. Cl.$^5$ .............................................. B01J 2/10
[52] U.S. Cl. ..................................... 425/222; 366/313
[58] Field of Search ......................... 425/222; 366/313

[56] References Cited

U.S. PATENT DOCUMENTS

| | | | |
|---|---|---|---|
| 3,430,928 | 3/1969 | Smith | 366/313 |
| 4,083,669 | 4/1978 | Cole | 425/222 |
| 4,826,324 | 5/1989 | Kunz | 366/313 |
| 4,881,887 | 11/1989 | Holley | 366/313 |
| 4,909,634 | 3/1990 | Suzuki et al. | 366/313 |

Primary Examiner—Willard E. Hoag
Attorney, Agent, or Firm—William J. Ruano

[57] ABSTRACT

An agglomeration device having a rigid cylindrical casing in which a shaft rotates having outer end portions of reduced diameter. The larger diameter portion of the shaft has relatively small rotating rings at the ends thereof which rotate in notched out cavities of plastic rings which are stationarily fixed to end plates of the agglomeration device. Triple labyrinth seals surround end portions of reduced diameter of the rotating shaft.

6 Claims, 1 Drawing Sheet

AGGLOMERATION DEVICE

This invention relates to an agglomeration device or mixer such as shown in my prior U.S. Pat. No. 4,881,887 dated Nov. 21, 1989.

BACKGROUND OF THE INVENTION

Keeping material in an agglomeration device and out of the shaft bearing has been a difficult problem. End seals have been used wherein the material had to migrate against a centrifugal force generated by the rotating end plates which were slightly spaced from stationary end plates.

SUMMARY OF THE INVENTION

An object of the present invention is to overcome the abovementioned disadvantage of prior end seals by providing rotating metallic end rings on the rotating shaft sandwiched in fixed plastic rings with very close tolerances between stationary and rotating segments which, in combination with a labyrinth type of seal, prevents the abovementioned migration of material against a centrifugal force.

DESCRIPTION OF THE PREFERRED EMBODIMENT

Figure 1:
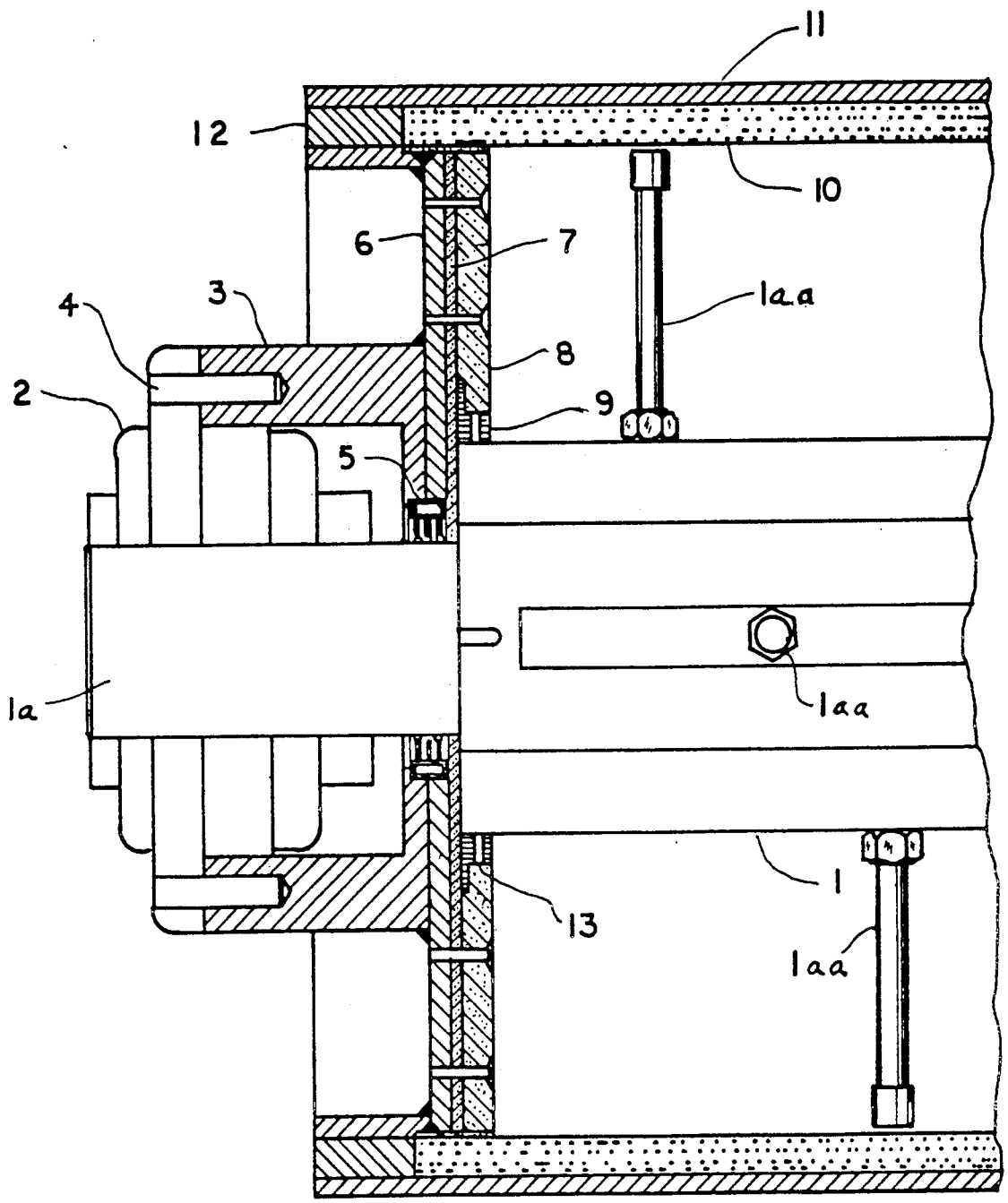
FIG. 1 is a partial vertical cross sectional view of an agglomeration device of the type shown in my prior patent which shows one of the end seals of the agglomeration device: the other end seal (not shown) being the same.

Referring more particularly to FIG. 1, numeral 1 denotes a rotating shaft of an agglomeration device on which rotating pins are mounted in staggered relationship. Ends 1a of the shaft 1 are of reduced diameter and rotate in piloted bearing 2 which is stationarily mounted to bracket 3 by pins 4, which bracket is integrally mounted on end plate 6 which houses a triple labyrinth seal 5.

Stationary steel drum 11 is rigidly secured to end plate 6 by seal 12 and has a cylindrical lining 10. In accordance with the present invention two fixed plastic rings 7 and 8 are rigidly attached to end plate 6, which rings are notched out adjacent shaft 1 to provide a space for a rotating steel ring 9 having a very close tolerance with both said rings and being rigidly secured to the rotating shaft 1 by set screws 13. Rings 7 and 8 are preferably of ultra high molecular weight, such as polyethylene, but they may be of any plastic material, such as polyurethane or Teflon. Ring 7 may be lubricated by grease injected through fitting 9 or by a nitrogen purge to further insure that material does not enter the labyrinth seal 5.

By virtue of the above described construction, material being rotated in the agglomeration device has been effectively prevented from entering the shaft bearing.

While I have illustrated and described a single specific embodiment of my invention, it will be understood that this is by way of illustration only and that various changes and modifications may be contemplated in my invention within the scope of the following claims.

I claim:

1. In an agglomeration device having a rigid cylindrical casing including end plates in which rotates a driven shaft with pin means extending radially outwardly thereof sweeping closely to the inner surface of the casing of said device: the improvement comprising ring means of nonmetallic material rigidly attached to the inner surface of said end plates with a notched out portion close to the surface of said shaft and a rotating metallic ring rigidly secured to the ends of said shaft and closely fitted in said notched out portion.

2. An agglomeration device as recited in claim 1 wherein said ring means comprises a pair of plastic rings, one of which pair of rings houses said ring means while in close sliding engagement with one of said rings, said shaft having end portions of reduced diameter encircled by multiple labyrinth seals which abut the outer surface of said rings.

3. An agglomeration device as recited in claim 2 wherein said plastic rings are of ultra high molecular weight polyethylene.

4. An agglomeration material as recited in claim 2 wherein said plastic rings are of polyurethane.

5. An agglomeration material as recited in claim 2 wherein said plastic rings are of Teflon.

6. An agglomeration material as recited in claim 2 together with a grease fitting on said end plates to enable greasing of one of said plastic rings.

* * * * *